United States Patent [19]

Lokhoff

[11] Patent Number: 5,467,360
[45] Date of Patent: Nov. 14, 1995

[54] APPARATUS FOR STORING ERROR PROTECTED DATA AS CODEWORDS AND APPARATUS FOR RECOVERING THE DATA

[75] Inventor: Gerardus C. P. Lokhoff, Eindhoven, Netherlands

[73] Assignee: U.S. Philips Corporation, New York, N.Y.

[21] Appl. No.: 197,020

[22] Filed: Feb. 15, 1994

Related U.S. Application Data

[63] Continuation of Ser. No. 814,944, Dec. 30, 1991, abandoned, which is a continuation of Ser. No. 491,371, Mar. 9, 1990, abandoned.

[30] Foreign Application Priority Data

Jan. 18, 1990 [EP] European Pat. Off. .............. 90200128

[51] Int. Cl.$^6$ ........................... G06F 11/10; H03M 13/00
[52] U.S. Cl. ................ 371/37.4; 371/37.5; 395/182.04
[58] Field of Search ........................ 371/30, 38.1, 39.1, 371/37.7; 369/275.2, 275.3; 360/22, 47, 48

[56] References Cited

U.S. PATENT DOCUMENTS

| | | | |
|---|---|---|---|
| 3,643,063 | 2/1972 | Marsh et al. | 235/61.1 |
| 3,836,891 | 7/1974 | McDaniel | 340/172.5 |
| 4,121,191 | 10/1978 | Corkhill | 340/15.5 DP |
| 4,211,997 | 7/1980 | Rudnick et al. | 371/37.4 |
| 4,336,612 | 6/1982 | Inoue et al. | 371/37.4 |
| 4,630,272 | 12/1986 | Fukami et al. | 371/37.4 |
| 4,646,170 | 2/1987 | Kobayashi et al. | 360/22 |
| 4,697,212 | 9/1987 | Osawa et al. | 360/48 |
| 4,719,628 | 1/1988 | Osaki et al. | 371/37.4 |
| 4,742,519 | 5/1988 | Abe et al. | 371/37.4 |
| 4,785,451 | 11/1988 | Sako et al. | 371/37.7 |
| 4,794,602 | 12/1988 | Tanaka et al. | 371/37.7 |
| 4,796,261 | 1/1989 | Moriwaki | 371/40.1 |
| 4,802,172 | 1/1989 | Fukami et al. | 371/38.1 |

FOREIGN PATENT DOCUMENTS

| | | |
|---|---|---|
| 0146639 | 7/1985 | European Pat. Off. . |
| 0169540 | 1/1986 | European Pat. Off. . |

*Primary Examiner*—Hoa T. Nguyen
*Assistant Examiner*—Ly V. Hua
*Attorney, Agent, or Firm*—Leroy Eason

[57] ABSTRACT

Apparatus for encoding digital data in accordance with an error protection product code into C1 codeword and C2 codewords, and storing such codewords on a plurality of parallel recording tracks on a record carrier. The code symbols of a given C1 codeword are assigned to a segment of a single storage track. The number of code symbols in a C2 codeword are a multiple of the number of tracks, and are cyclically assigned to segments of all tracks and cross intersegment boundaries, the physical spacing between adjoining symbols of a C2 codeword being substantially uniform in both coordinate directions. The storage requirements of the coding apparatus can be reduced if the number of symbols in each C2 codeword is an integral multiple of the number of tracks. In both the encoder and decoder, the RAM for storing codewords is organized so that the addresses of the symbols of any codeword have a 1:1 correspondence with the positions of such symbols on the tracks.

25 Claims, 5 Drawing Sheets

TABLE 1 d = u mod 2048
e = u div 2048

(d = 0 ... 2047    e = 0 ... 3) ==> t = ((((d div 8) mod 13) + 1) * 5
    − (((d div 8) mod 13) div 6) * 30
    + (((d div 8) mod 13) div 12) * 30)
    mod 8 b = (d mod 8) + (e * 8)

i = (d div 104) * 2
    + (1 − 2 * (e mod 2)) *
    (((d div 8) mod 13) div 6
     − ((d div 8) mod 13) div 12)
    + (e mod 2)

APPARATUS FOR STORING ERROR PROTECTED DATA AS CODEWORDS AND APPARATUS FOR RECOVERING THE DATA

This is a continuation of application Ser. No. 07/814,944, filed Dec. 30, 1991, now abandoned, which is a continuation of application Ser. No. 07/491,371 filed Mar. 9, 1990, now abandoned.

BACKGROUND OF THE INVENTION

1. Field of the Invention

The invention relates to an apparatus for reversibly storing digital data as error protected product codewords on a multitrack record carrier. In particular, the record carrier may be a magnetic cassette tape that has a plurality of parallel recording tracks. Alternatively the "tracks" could be successive revolutions of what is effectively a spiral on a disk, such as an optical recording disk. Such storage of digital data is notoriously sensitive to mutilation, which may result in alteration of any arbitrary bit or of long strings of bits along a particular track, particularly bit strings which have patterns having a high error probability. BCH codes over finite fields have proven to be advantageous for error protection, in particular Reed-Solomon codes defined for multi-symbol words, each symbol being an 8-bit element of a finite Galois field, the codes being cyclic at the symbol level. The ordinary-skilled technician could, however, omit various of these code characteristics without deviating from the basic concept of the invention.

2. Background Art

Background information concerning digital audio tape recording and error protection of the recorded digital data can be found in various publications; for example, "Principles of Digital Audio" by K. C. Pohlmann, 2d ed. 1989, H. Sems & Co., and "Error Control Coding" by S. Lin et al, 1983, Prentice-Hall, Inc.

SUMMARY OF THE INVENTION

The invention provides an apparatus for storing digital data with a degree of error protection consistent with a reasonable complexity of encoding and decoding, and realizing such protection in a regular data format. According to one of its aspects, the invention provides recording apparatus for storing digital data on a storage medium having a plurality of substantially uniform data storage tracks, and which employs an error protection encoding operation utilizing a first symbol correcting code which defines first code words (C1 code words) and a second symbol correcting code which defines second code words (C2 code words), the first and second symbol correcting codes together constituting a product code. The apparatus includes first encoding means which uses the first code to generate error protected C1 code words, the symbols in each C1 code word being assigned to a particular single track, and second encoding means which uses the second code to generate error protected C2 code words the symbols of which are cyclically distributed among all of the plurality of tracks. Each C2 code word has a number of symbols that exceeds said plurality of tracks. The number of symbols in a C2 codeword is preferably an integral multiple (>1) of the mulitplicity of tracks, since that enables systematic operation of the apparatus. However, in the case of a truncated code word it can be provided with fiduciary zeros or other indicia to obtain the requisite numbers of symbols, and such fiduciary indicia need not be stored. The apparatus also includes means for physically disposing the symbols in any C2 code word so that the spacing between physically neighboring symbols thereof on the storage medium is substantially uniform and has non-zero components both along the tracks and across the tracks.

The storage format so attained provides protection against possible row errors that could afflict a large fraction of the data on any single track, and against column errors that could afflict a plurality of code symbols that in principle are written simultaneously, if tape skew is ignored. Furthermore, protection against drop-out patches of the recording medium is also realized.

Advantageously, among said non-zero components the cross-track component derives from a uniform across track jump between successive symbols of a C2 code word which is an integral number of tracks modulo said plurality, said integral number also being prime relative to said plurality. This allows for easy address calculations.

Advantageously, among said non-zero components the along-track component results from a uniform-along-track component of the jump between successive symbols of said C2 code word. This further simplifies address calculation.

Write means may be provided for magnetically writing in parallel tracks on a magnetic tape record carrier. If high quality magnetic tape is employed that will allow for high-density data storage and high-rate transfer. However, standard tape can be employed if the bit wavelength is kept sufficiently long.

Preferably, the write means interface to a plurality of tracks which are mutually adjoining. This simplifies relative positioning of the write means and further raises attainable storage density.

Preferably, the plurality of tracks is disposed on half the width of said tape, the outer edge track being filled with parity symbols that respectively pertain to respective associated C2 code words. Outer tracks are slightly more susceptible to mutilation, and so in consequence of storage of code words only on inner tracks the overall susceptibility to error is diminished.

Preferably, each track has a sequence of data storage blocks, each block containing a uniform integral number of C1 code words, said integral number being 2, and within any block the symbols of the two C1 code words are interleaved. This improves the uniformity of the code word storage organization.

Preferably, ignoring tape skew, the physical disposition of C1 words among the plurality of tracks is mutually synchronous. This lowers requirements for buffering in the recording apparatus.

Preferably, again ignoring tape skew, the physical disposing of said blocks among the plurality of tracks is mutually synchronous, and on each track a plurality of blocks is contained in a tape segment of uniform size. A plurality of tape segments is contained in a tape frame of uniform size, the tape segments and tape frames being mutually synchronous among the plurality of tracks, and each C2 code word is fully contained in a single tape frame. This further raises the uniformity of storage organization.

Preferably, mutually synchronous blocks among all tracks constitute a slice, and the symbols of each C2 code word are uniformly distributed over all slices of a frame. This further improves uniformity of storage organization.

Preferably, there is provided a RAM encoding memory accommodating storage of data for recording on a plurality of tape segments, to wit an input RAM segment for therein receiving user data for an intended tape segment; a series of RAM segments for therein storing user data of a corresponding series of intended tape segments, which data is stored as associated C1 and C2 code words; and an output RAM segment for outputting the code words for recording as a fully encoded tape segment. Whereas the C2 code words may be distributed over a plurality of RAM segments and the C1 code words over a single segment, the total storage capacity required is only two RAM segments more than the number covered by the distribution of the C2 code words.

Preferably, the number of said plurality of tracks is equal to 8. This is a good trade-off between high transfer rate and moderate apparatus complexity.

Preferably, the C1 code is a (24, 20, 5) code and the C2 code is a (32, 26, 7) code, the last numeral in each case being the code distance. These codes, in particular as combined in a product code, provide immunity against a wide range of errors. Nevertheless, the mathematical complexity of executing correction and/or detection of errors remains simple. In particular, odd-distance codes were found to team up better than even-distance codes, even if the codes have rather different distances.

Preferably, each frame comprises 384 C2 code words. This achieves balance between simple organization and large storage capacity of the RAM.

Preferably, the non-zero displacement component across the tracks derives from a jump of +5 modulo said plurality of tracks. This allows for simple address processing.

Preferably, the storage medium is a reversible storage medium. In addition to magnetics, also state of the art optical storage media can be employed.

The invention also relates to transmission apparatus for interfacing to an intended storage medium and provided with encoding means for executing an encoding operation and transmitting means fed by the encoding means for transmitting product code words by means of broadcast and/or physical guidance means.

In particular, the invention could be used in cases where the data store is separate from the encoder, for example, controlled by a different entity at the receiving end of a broadcast link. The combination of encoding and storing would then together comprise the storage device, the encoding being performed as if the storage device were effectively present at the encoder. Transmission can be by radio, cable, optical or other means.

Preferably, such apparatus would comprise reception means for an analog audio signal and analog to digital conversion means fed by said reception means for providing at least a substantial part of the digital data for subsequent encoding using the product code. Direct audio to coded-data conversion provides an effective counter-measure to interference by external disturbances.

The invention also relates to decoding apparatus for use with one or more of those recited supra or for emulating the storage medium, comprising access means for accessing said real or emulated storage medium, internal storage means for accommodating all data contained within a set of C1 code words and within a set of C2 code words, said sets together constituting a smallest product code block, first decoding means for decoding the C1 code words in said set thereof, and second decoding means for thereafter decoding the C2 code words in said set thereof. The second decoding means includes accessing means which, for decoding any particular single C2 code word, accesses said storage means at addresses corresponding to physical on-medium positions that have substantially uniform distances between neighboring, recorded symbols in such code word, any such distance having non-zero components both along the tracks and across the tracks. The storage means may be physically united with the decoding device or could be present at the encoding device. The sequence would then be: encoding-storing-broadcasting or otherwise transmitting. The same advantages would be obtained with any of such organizational arrangements.

The invention also relates to apparatus for reading and decoding such digital data, the decoding more or less mirroring the procedure followed at encoding. Advantageously, such read apparatus comprises a multisegment RAM memory and means for sequentially filling a predetermined plurality of RAM segments with data from said real or emulated storage medium, wherein any C1 code word is entirely assigned to one single RAM segment and any C2 code word is entirely assigned to one single multisegment RAM frame, the symbols of a C2 code word running with a uniform row jump and a uniform column jump through such RAM frame modulo the dimensions of said RAM frame. This results in a relatively low required storage capacity.

Advantageously, each segment of the multisegment RAM memory accommodates a uniform number of C1 code words which are uniformly distributed among the tracks of a single segment of said plurality of tracks, so that any track segment fits 1:1 on a RAM segment. Upon filling of a RAM segment, decode means directly activates decoding of any C1 code word in such segment. Fast activation of the decoding diminishes the time lag between reading and reproducing of stored information.

Advantageously, storage of the C2 code words crosses intra-memory segment boundaries of a first plurality of segments up to a further plurality of segments but no other intra-memory segment boundaries, said apparatus having second decoding means which, after storing of said C2 code words in said first plurality of memory segments and decoding by said first decode means, activates decoding of said C2 code words. Such time lag, by means of this stratagem, is kept low as well.

Advantageously, said memory accommodates, in addition to said further plurality of memory segments, an input segment for inputting data of one storage medium segment and an output segment for outputting data of one already decoded storage medium segment. For example, a four-segment frame would then only require a six-segment memory. The above advantages clearly have their counterparts in the storage device mentioned earlier.

The invention also relates to an information reproducing device and containing a decoding device as recited supra, comprising holding/driving means for said storage medium in the form of a magnetic tape, head means for time-sequentially accessing a stretch of locations on said tape, and audio reproduction means fed by said decoding device. Such device would constitute represent a price-effective consumer entertainment apparatus for general use. In particular, the decoder part thereof could well be contained in a single-chip.

The invention also relates to a unitary storage medium in the form of a magnetic tape for use with a decoding device as described above, and comprising said plurality of substantially uniform storage tracks, said tracks comprising a storage frame which is equally distributed over said parallel tracks, the tracks being disposed on one half of said magnetic tape. The storage frame is protected by a symbol-correcting block product code as represented by C1 words and C2 words, each C1 word being disposed within exactly one of said tracks, each C2 word being disposed over all of said tracks, each C2 word having a number of symbols that is an exact multiple of the number of tracks, the physical spacing among neighboring symbols of the C2 word being substantially uniform and having non-zero components both along said tracks and across said tracks.

The invention also relates to magnetic tape storage medium as described which is contained in a cassette that interfaces to the described apparatus. Such cassette would still further improve the physical integrity of data storage.

BRIEF DESCRIPTION OF THE DRAWINGS

The invention will be explained in detail hereinafter, with respect to a preferred embodiment that is shown in the appended Figures. In particular, first the data format and associated decoding and encoding procedures are explained. Thereafter the error protection code format will be discussed in detail. Now, in the Figures.

DESCRIPTION OF PREFERRED EMBODIMENTS

Figure 1:
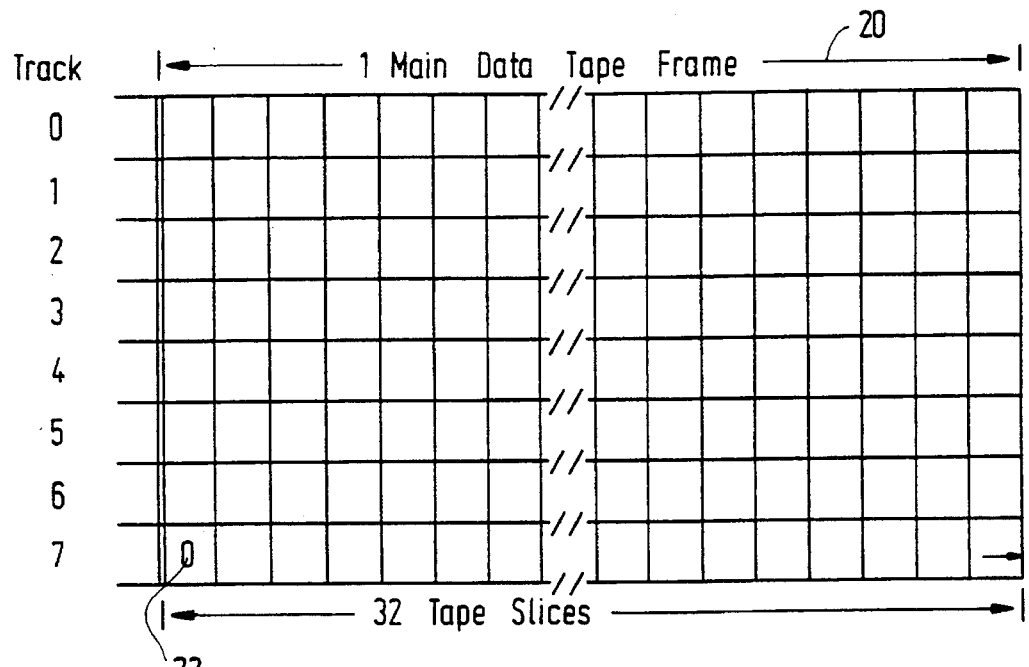
FIG. 1 shows a main data tape frame format according to the invention.

FIG. 1 exemplifies the main data allocation in a tape frame, that is, user data plus associated error correction redundancy data. Further, in this respect, Table 1 formalizes the mapping of user data onto the tape. The user bytes (or symbols) are numbered sequentially. Their internal organization is not considered; they could, however, derive from digitized single channel or double-channel audio, video, or other data source. Each byte D has three indexes t, b, i, namely track number t [0 to 7], tape block number b [0 to 31], and symbol number i within a block [0 to 47]. The number of user main data bytes in a tape frame is 8192. The placement of these bytes according to their placement number u [0 to 8191] is found with the formulae of Table 1. Use is also made of two intermediate variables d, e, wherein e in effect is a segment number and d the number of a slice within the segment in question. In addition 128 system information symbols may be accommodated to give a total of 8320 non-redundant symbols within the product code block. The RAM, to be discussed hereinafter, has 32 (corresponding to 8 tracks in each of 4 track segments) and 384 rows (corresponding to 8 data blocks per track in each track segment, and 48 symbols per data block), and so accommodates 33×384=12288 symbols. The number of redundant symbols is thus 12288+8320=3968 symbols. This number is lower than the sum of the redundant symbols of each of the C1 code words and C2 code words because several redundant symbols are part of two code words. This in fact results from the principle of a product code.

Now, as shown in FIG. 1, for storage on tape eight tracks 0 . . . 7 are provided. The data, inclusive of redundant error-protection data, is carried in units called tape frames. Each tape frame, indicated by arrow 20, covers all eight tracks. Each tape frame is divided into 32 consecutive tape slices shown as columns. Each tape slice contains 8 tape blocks, one tape block for each track. Also, a tape frame is divided into four frame segments that each contain 8 consecutive slices of the tape frame in question. These frame segments have not been indicated in the Figure. One tape block 22 corresponds to 408 unmodulated main data bits, that in actual practice are modulated to form 510 channel bits. For brevity, however, the modulating into channel bits has not been detailed further and the description hereinafter only applies to the unmodulated bits. On the tape, corresponding tape blocks of different tracks are aligned as shown. Each tape block consists of a sync-pattern of 10 bits, a number-indication symbol of 8 unmodulated bits and a parity symbol of 8 unmodulated bits, which leaves space for 48 code symbols. The subsequent consideration relates to the latter 48 symbols per block, $48 \times 32 \times 8 = 3 \times 2^{12} = 12288$ symbols per frame. The code used will be discussed hereinafter.

(1) Product Decoder Apparatus

Figure 2A:
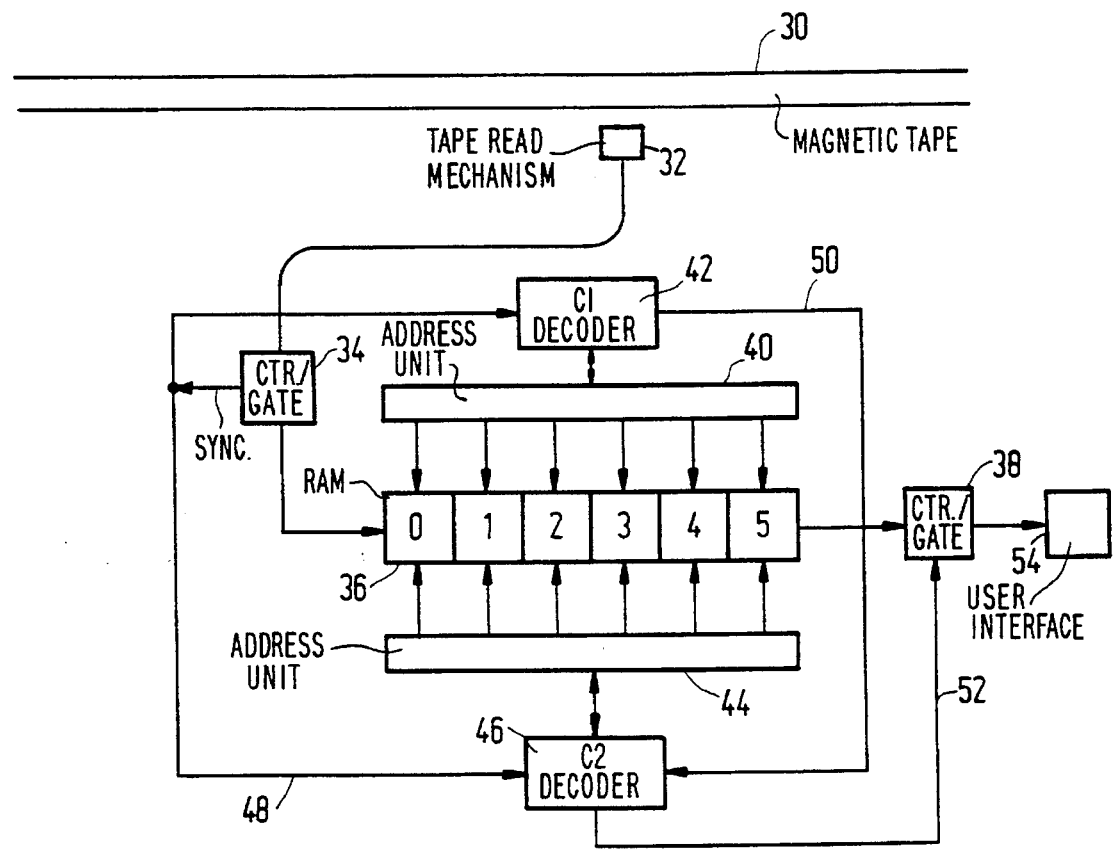
FIG. 2a is a block diagram of a product decoder according to the invention.
Figure 2B:
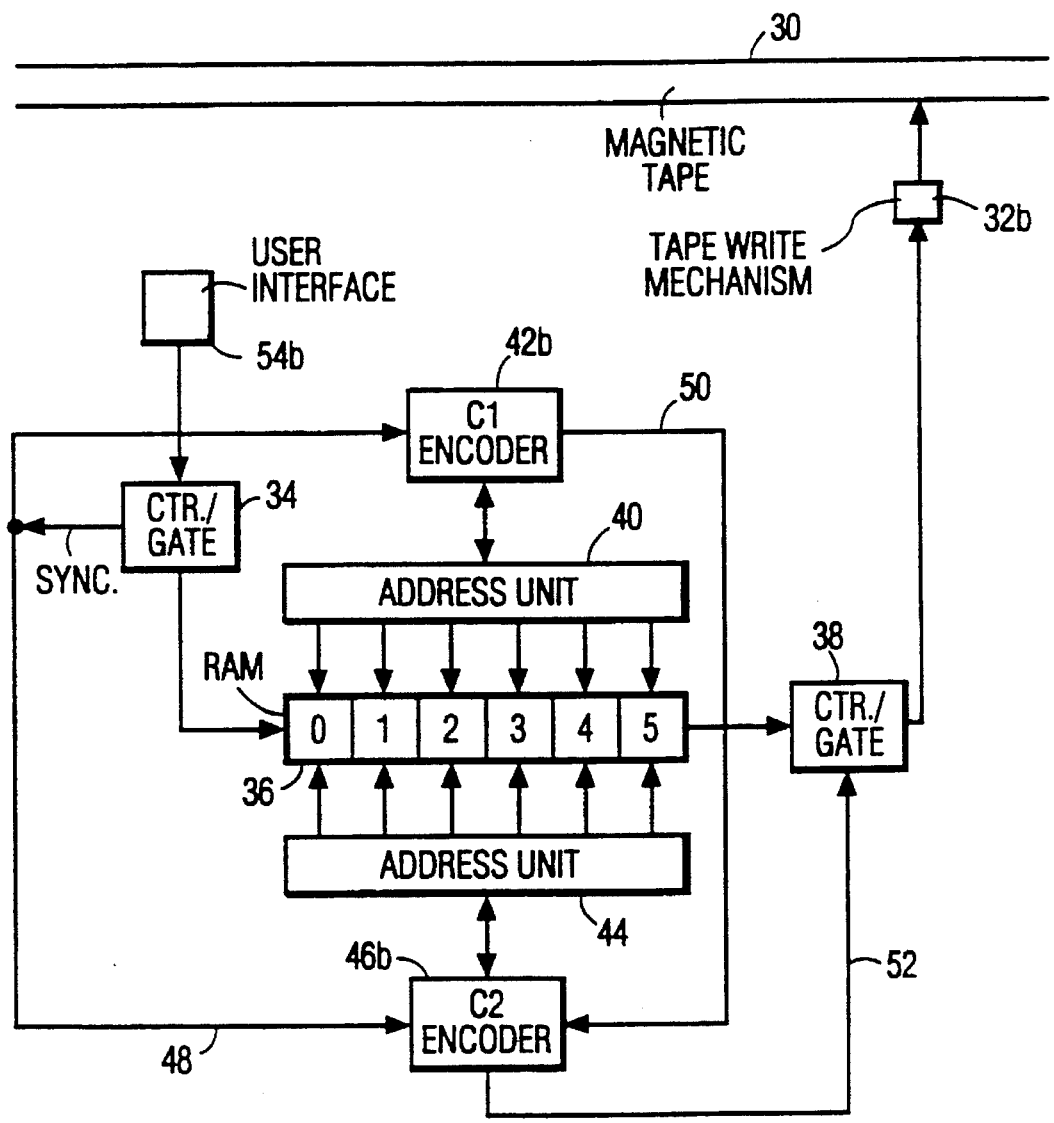
FIG. 2b is a block diagram of a corresponding product encoder.
Figures 3, 8:
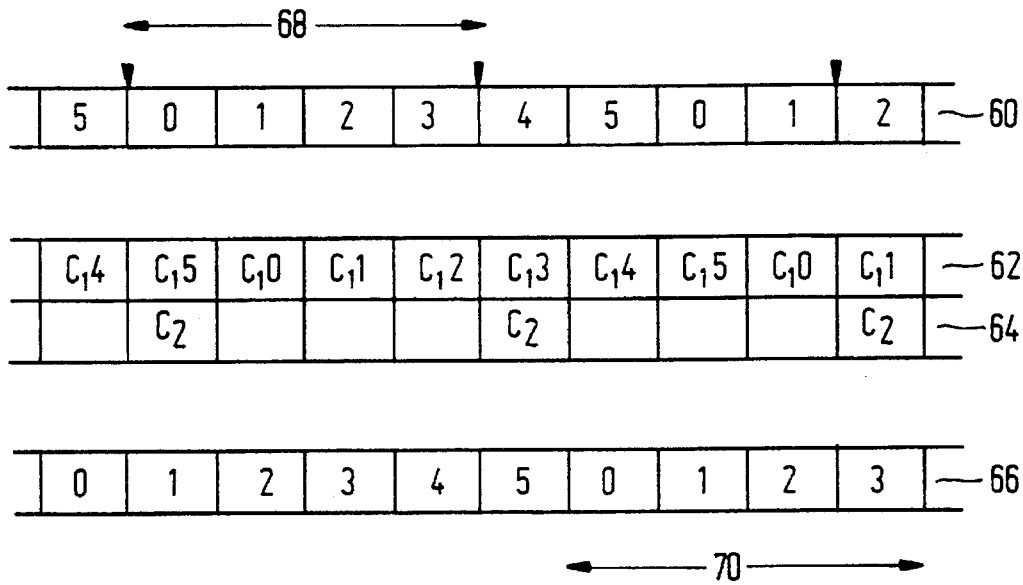
FIG. 3 schematically shows RAM segment accessing in the RAM storage device of FIGS. 2a and 2b.
FIG. 8 formalizes the mapping of user data on the tape.

FIG. 2a is a block diagram of a product decoder apparatus embodiment. The tape 30 is read simultaneously in eight parallel tracks by a tape read mechanism 32. In actual practice, a demodulator would also be necessary to execute channel bit demodulating. Block 34 is a counter/gate driven by a synchronization mechanism, not shown, and counts off the bytes, segments, and frames. RAM 36 comprises six RAM segments, or pages, that are numbered 0–5. It is gated by counter/gate 34, which provides write addresses by successive incrementation and also gates the data read from the tracks to RAM 36. Another counter/gate 38 gates data read out from RAM 36 to a user output interface 54 and provides read addresses by successive incrementation. In this way RAM 36 is a first-in-first-out buffer with respect to the tape data. As symbolically shown, block 42 is a C1 codeword decoder that bidirectionally accesses RAM 36 via an address unit Likewise, block 46 is a C2 codeword decoder that bidirectionally accesses RAM 36 via its own address unit In this respect, FIG. 3 schematically shows the segment-wise accessing of RAM 36 by write counter/gate 34. Inasmuch as time goes from left to right in the Figure, all six RAM-pages are filled or overwritten in cyclical sequence. The physical disposition of the segments in the RAM structure is of no consequence to the decoding organization. In FIG. 3, row 62 shows the decoding operation by C1 decoder 42. Decoder 42 receives a synchronizing signal from counter/gate mechanism 34 on line 48, and in consequence, knows the instant at which a complete segment has been stored in RAM 36 and also its address (range). Now inasmuch as each C1 code word of 24 symbols (bytes) is completely contained within one tape segment and each tape segment is one-to-one mapped on a single RAM segment, the C1 decoding can be effected directly on the most recently received tape segment. As shown in row 62, this leads to a cyclical sequence that is delayed by one segment interval with respect to row 60. Furthermore, inasmuch as each C2 code word of 32 symbols is completely contained within one tape frame of four tape segments and each tape frame by means of the segment mapping is one-to-one mapped on four consecutive RAM segments, the C2 decoding can be effected directly on the four segments after the last thereof has been received, provided that the C1 decoder has finished its operation (regardless of whether the correction has been successful or not). In row 60, the small arrows indicate the frame boundaries. As shown on row 64, the C2 decoding is effected during a single segment interval following the complete reception of the frame in question. As shown in FIG. 2(*a*), C2 decoder 46 is also synchronized by counter/ gate 34 via line 48, and moreover, receives a "ready" signal from C1 decoder 42 on line 50. When the C2 decoder has finished its operation, line 52 may carry a "free" signal to output counter/gate 38. Alternatively, the latter may be unconditionally synchronized via a signal on line 48. Row 66 in FIG. 3 shows that completion of the operation of C2 decoder 46 is followed by read access on the four consecutive RAM segments that had been decoded during the most recent operation of C2 decoder 46. Thus, the four tape segments received during interval 68 are outputted during interval 70. In consequence the whole arrangement of FIG. 2*a* functions as an error correction FIFO with an incurred delay of five tape segment intervals. It is clear that six RAM segments are necessary and sufficient for the storage. If the C2 decoding were to take more time, for example two or three tape segment intervals, the storage requirements would amount to seven or eight RAM segments, respectively. In FIG. 2*a* RAM 36 has a four-port facility. Inasmuch as decoders 42, 46 function alternatively, their respective operations may be mapped on a single hardware facility that is suitably programmed. Moreover, inasmuch as writing into RAM 36 by counter/gate element 34, reading by counter/gate element 38 and decoding by decoders 42, 46 never take place on the same RAM segment, on a segment level RAM 36 may be limited to a one-port facility. In the case of a truncated C2 codeword decoding could be commenced somewhat earlier, the end of such word being indicated by an external signal.

The arrangement described above may comprise a reset functionality, not shown, which is activated for example upon recognition of correct accessing of the first frame. This may be signalled by the first frame start encountered after block headers have begun to show up correctly. Furthermore, as described infra, the C1 code words are confined to one respective block only. In consequence this could be used to achieve a slight further acceleration in that C1 decoding would start directly after receiving the associated block. Estimation of the cost of such operation has revealed that the additional cost of such a more complicated control arrangement would in some cases outweigh the additional benefits.

(2) Product Encoder Apparatus

The arrangement of FIG. 2*a* has been described as relating to decoding of data read from tape and which is to be presented to a user output interface 54. A very similar arrangement, as shown in FIG. 2*b*, could be used for product encoding, wherein the C1 code word encoding is segment-wise effected by C1 encoder 42, after which frame-wise C2 code word encoding is effected by C2 encoder 46. The product encoding arrangement in FIG. 2*b* is very similar to the product decoding arrangement in FIG. 2*a*, the changes being replacement of tape read mechanism 32 by the user input interface 54*b*, and replacement of output interface 54 by the tape write mechanism 32*b*. Corresponding elements in FIGS. 2*a* and 2*b* have the same reference numerals, but with a "b" suffix in FIG. 2*b*. Of course, in FIG. 2*b* the elements 42*b* and 46*b* are codeword encoders rather than codeword decoders as in FIG. 2*a*. However, the operation and construction of such circuits is the same, whether employed for coding or decoding.

Alternatively, the encoding arrangement in FIG. 2*a* could be modified to also enable such arrangement to be used as an encoder. For example, in FIG. 2*a* the tape read mechanism 32 can be a read/record mechanism, and interface 54 can be bidirectional. The input to the RAM would then include a multiplexer so that it is either fed by read/record mechanism 32 or by interface 54. Also, the output of the RAM would include a demultiplexer to either interface 54 or mechanism 32. As another possible modification, since generation of error correction redundancy symbols is somewhat simpler than decoding, the codeword encoder 42*b*, 46*b* could be simplified. For example, no feed-back operation is necessary in an encoder, whereas in a decoder an unexpected outcome, such as an uncorrectable error in a C2 word, would necessitate additional measures to be taken.

The combined symbol correcting codes yield a product code system. This means that the time sequence of C1 encoding and C2 encoding is irrelevant. After the user data of a complete segment has been stored in the RAM, either the redundancy symbols of the C1 code words can be calculated first, or, alternatively, first the redundancy symbols of the C2 code words. Conceptually, the user data of a product code can be visualized as a matrix wherein the redundancy consists of three parts:

a. redundant symbols along the rows
 b. redundant symbols along the columns
 c. doubly redundant symbols along the redundant columns, which are identical to the doubly redundant symbols along the redundant rows.

Further considerations as to reading also apply to the writing of the code words.

For simplicity, various well known electromechanical features have not been described, such as the holding/driving of the tape, feed-back looping with velocity, and read/record head construction. Details of the RAM addressing will be described below.

(3) Error Protection Code Format

Figures 4, 5:
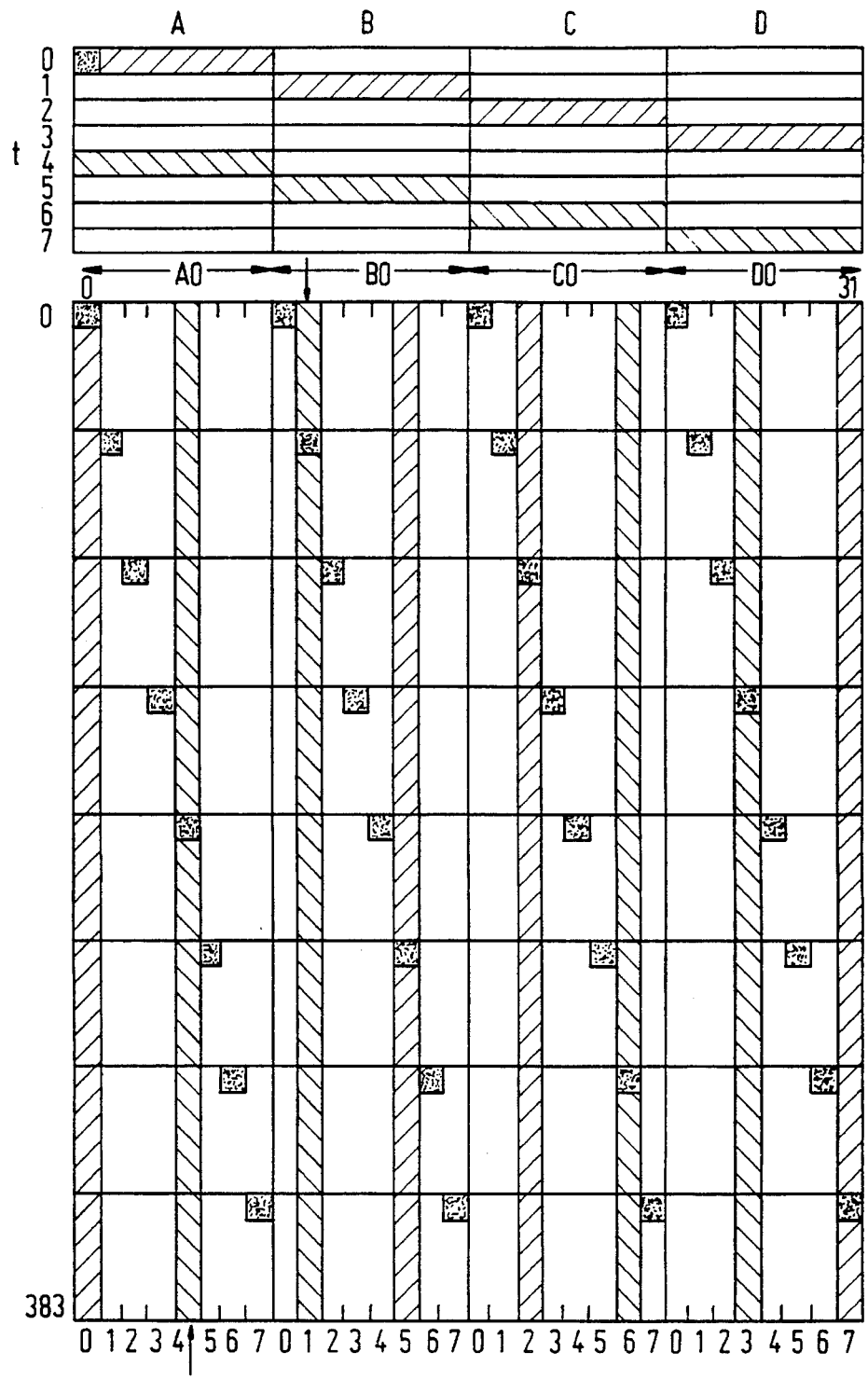
FIG. 4 shows the mapping of data stored on the tracks of a vacant carrier.
FIG. 5 shows the data mapping in the RAM.

FIG. 4 shows the data mapping on the tape, in particular one frame with its four tape segments A . . . D, each tape segment having respective equal-sized fractions thereof disposed on each of eight tracks 0 . . . 7. Within each tape segment, two respective tracks have been shown hatched to show that the data is recorded in such a way that on each track the data of a portion of only one segment of a data frame is recorded.

FIG. 5 shows the mapping of the data in such tape frame into four RAM segments AO, BO, CO, DO, the total content of any tape segment being mapped exclusively on the like-indicated RAM segment, such as A-to-AO. The two remaining RAM segments, according to FIGS. 2*a*, 2*b* and 3, may left out of consideration with respect to the tape frame in question, because they do not contribute to the product code of the frame now under consideration. It should be noted that whereas the vertical scale in FIG. 4 (track numbers) corresponds to the horizontal scale in FIG. 5 (memory columns within each respective RAM segment as shown at the lower edge), the horizontal scale of each tape segment of FIG. 4 has been expanded vertically in FIG. 5 for better clarity, as represented by the larger area of FIG. 5 as compared to that of FIG. 4. The representation in FIG. 5 has been chosen to illustrate a logical structure of the storage arrangement. In practice, physical constraints, in particular, available address ranges, may lead to a physical setup that is different, but which may be attained by an elementary address transposition. Each of the hatched track segments of FIG. 4 is mapped to a column of the corresponding RAM segment in FIG. 5, as shown by corresponding orientation of the hatching. The RAM as shown has 32 columns 0 . . . 31 and 384 (=8×48) rows (0 . . . 383), each location so defined accommodating one symbol. As shown, the mapping is one to one, the column number of the RAM segment being equal to (t*5)mod 8. The column number in the complete RAM is then found by adding 8 times the segment number, which for RAM segments AO, BO, CO, DO is 0, 1, 2, 3, respectively. Always, t is the track number. For example, for t=5 in tape segment B, the column number in RAM segment BO is (5×5)mod8=1, as shown by an arrow. The mapping in the other direction is the same inasmuch as track 1 is mapped on column 5, within RAM segment BO.

Second, the disposition of the C1 code words in the RAM is considered. Now, each block, of 408 unmodulated bits, has two (2) C1 code words of 24 symbols each (and three other symbols, not relevant here). The symbols of the two code words are interleaved in that odd-numbered symbols belong to one code word and even-numbered symbols belong to the other. This also applies to the eight redundant symbols within each block, which are the last symbols of the block (right hand end in FIG. 1) on the tape. In consequence, in RAM they fill the lowest eight rows of each set of 48 rows.

Third, the disposition of a C2 code word in RAM is considered. FIG. 5 shows one particular code word that starts with the symbol at row 0, column 0. Thereafter, the row jump is 48 and the column jump is one. In consequence, each next symbol relates to a different track. Further, each next symbol jumps by one block in the forward direction of the tape track. The cross track jump is plus (+) five tracks modulo 8 (without carry or borrow). For the one code word in question, all symbols have been highlighted in FIG. 5 as dark squares. Transposition to other code words is effected by shifting all symbols over a uniform number of rows (with rotation between the upper and lower edges) and/or over a second uniform number of columns (with rotation between the left and right edges).

Figure 6:
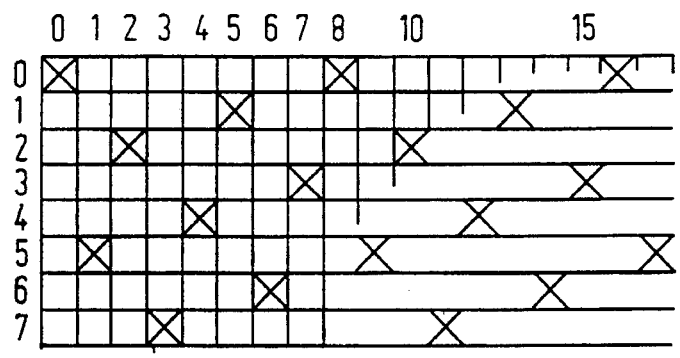
FIGS. 6, 6A show the disposition of the symbols of a C2 word on the tracks of a record carrier.

In this respect, FIG. 6 shows the disposition of the first 18 symbols of the C2 code word highlighted in FIG. 5, each cross now representing one symbol of the block of 48 symbols in question. Each next symbol now is in a next tape block column, and shifted over five tape tracks (mod 8) without carry or borrow. For simplicity, the position of the respective symbols within their associated blocks has not been shown. As clearly visible, on a block basis the physical distance between neighboring code symbols is substantially uniform.

Figure 6A:
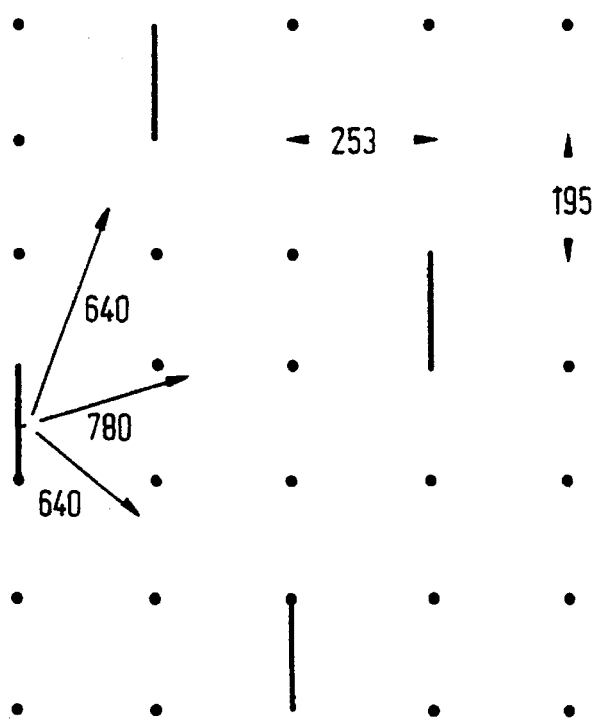

In a typical embodiment, envisaged tape speed is 4.76 cms/sec at a bit rate of 96 kilobits per second. This results in a bit length of 0.495 micron. Track pitch is intended as 195 microns, which means that in such longitudinal recording the bit area is substantially shorter than wide. Each tape block has 510 channel bits, resulting in a block length of 253 microns, which means that the area covered by a block is 253×195 microns and so can be considered approximately square. Thus the uniform distances in FIG. 6 would effectively translate to a substantially uniform distance between respective neighboring code symbols of a C2 code word. In this respect, FIG. 6A shows the center-to-center distances between neighboring symbols of a C2 code word in the three possible relative dispositions. The symbols are shown as vertical bars within their blocks, of which only the corners have been indicated by dots. The relative center-to-center distances of 640, 780 microns relate as 1:1.22. Other relationships, such as up to 1:1.3 or even up to 1:1.4, could also be considered as yielding a substantially uniform distance between nearest neighbors. The Figure takes into account that the code symbols within their respective blocks have identical positions. The uniform distance results in a good robustness of the codewords against error due to scratches and other burst-type errors. In effect the C2 code, having a distance of 7, at six redundant symbols (n,k=32,26) may correct up to six erasure symbols per word. This applies in case that the C1 codewords have provided pointers to all mutilated symbols of the codeword in question. In that case a circle in FIG. 6 encompassing such six symbols, and assuming 100% erasure thereof, would not cause breakdown of the error correction capability. In FIG. 6 this would correspond to a width of six blocks on a row, which is only 1,5 millimeter, which is considered tolerable for almost every purpose. Even in case the lay-out were to be changed to disk-type storage, the same advantageous properties are realizable provided that the ratio of the diameter of the outer track to that of the inner track of the tracks in a frame is substantially equal to one. In practice, a ratio of 1—1 or even somewhat more would be readily acceptable.

As a further measure to increase error resistance of the code format, track number 0 is filled completely with the redundant symbols of the C2 code; in the highlighted code word of FIG. 5, this refers to the code symbols (4) in the top row of the RAM memory, having symbol numbers 0, 8, 16, 24. The same applies to all other C2 code words inasmuch as the first symbol thereof is always assigned to the leftmost segment column. Furthermore, the other parity symbols have the following rank: for even-numbered C2 code words (0, 2 . . . 382) they are positioned at symbols 7,23; and for odd-numbered C2 codewords (1,3 . . . 383) they are positioned at symbols 15, 31. This means that all those other redundant symbols are mapped on track 3, which is now 50% covered with parity symbols.

The advantage of filling track 0 completely with redundant symbols can be seen as follows. The set of eight tracks discussed earlier, about 1.2 millimeters wide, covers one half the width of ⅛" tape. For reverse use, a second set of tracks is provided in the same format on the other half width of the tape. Now, both tracks 0 run at the outer edges of the recording track proper and thus, generally are somewhat more exposed to mutilating interference, tape wear, etcetera. Now in case the outer track be the only one mutilated, the remaining data integrity would be upheld, as signalled by correct performance of the C2 code, whereas the C1 code would signal irreparability for the outer track.

Figure 7:
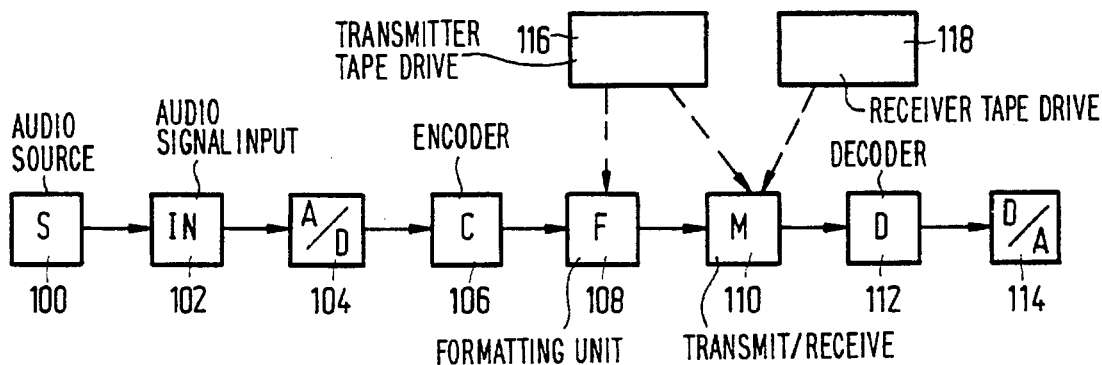
FIG. 7 illustrates a transmission system using the present invention.

FIG. 7 illustrates a complete system for use of the present invention in its various embodiments. Block 100 is a source for analog audio signals. This may be, for example an audio record player, a loud-speaker, or a naturally occurring audio source such as an orchestra. Block 102 represents an audio input to the system, such as a microphone or wire connection, plus its associated audio amplification, filtering, etc. Block 104 represents the analog to digital conversion of audio samples received from element 102. Block 106 represents encoding as referred to earlier, complete with digital processing provisions and an encoding RAM. Block 108 represents a formatting unit for the encoded data, thereby generating the data segments for recording on a tape. These segments can be outputted in various different ways, such as parallel 8-bit bytes. Alternatively, such parallel 8-bit bytes may be serialized to single bit width for broadcast, cable or optical wave guide transmission. Block 110 represents the broadcast transmitter, broadcast medium and broadcast receiver combined. Alternatively, such elements may be adapted for cable or wave-guide use. Further alternatively, block 110 may comprise a magnetic head for writing and reading, respectively, for storage on a digital audio tape or disc. The audio tape or disc may be housed in a cassette of suitable box-like or envelope-like dimensions, shaped according to protective needs, storage requirements, accessibility and commercial promotivity. If required, read head(s) and write head(s) may be integrated or even combined into a single head or head set. Block 112 represents the decoder device together with its decoding RAM. Block 114 represents an output unit, comprising D/A conversion, de-interleaving, amplification and loudspeaker insofar as required. Block 116 represents a driving mechanism at the transmitter of the encoded data, for example as a tape drive. Block 118 represents a similar driving mechanism at the receiver of the encoded data. In certain commercial applications, such as a reversible recorder, the driving mechanisms could be integrated as a single driving mechanism. For brevity, various constructional and organizational details have been omitted. It should be noted that the transmitter operates as if the receiver were actually present, and as such emulates the presence of the receiver; i.e, it operates as if the receiver were present. Likewise, the receiver operates as if the transmitter were present.

We claim:

1. Apparatus for encoding data words included in a digital information signal as error protected codewords and recording said codewords on a record carrier having a number N, where N>2, of coextensive recording tracks, the signal having successive frames of data words, each data frame having a predetermined number of data segments, each data segment having a predetermined number of data blocks, each data block having a predetermined number of symbols of data words; said apparatus comprising:

first encoding means for receiving a data frame of said digital information signal and forming first codewords C1 from the symbols in the data blocks of each data segment of said data frame, each first codeword C1 including parity symbols in accordance with a first error protection code;

second encoding means for receiving said data frame and forming second codewords C2 from the symbols in the data blocks of each data segment of said data frame, each second codeword C2 including parity symbols in accordance with a second error protection error code;

the C1 and C2 codewords derived from the symbols of any particular data word constituting a product code such that a symbol in a codeword of either of said codes is also a symbol in a codeword of the other of said codes, whereby a symbol error can be corrected on the basis of either of the codewords in which said symbol error appears;

a data store connected to said first and second encoding means to receive C1 and C2 codewords therefrom and store the respective symbols of said codewords at respective store addresses, said store addresses being at locations in said data store corresponding to respective positions on said tracks; and write means connected to said data store, said write means including a write head for simultaneously scanning all of said tracks and concurrently recording in respective coextensive segments of all tracks the symbols stored at store addresses included in corresponding segments of said memory;

the positions of the store addresses in said data store being such that when the symbols stored therein are recorded on said tracks the symbols of any particular C1 codeword are all on a single track in a single track segment and the symbols of any particular C2 codeword are distributed among a plurality of the tracks in a plurality of the track segments, the spacing between the adjoining recorded symbols of any particular C2 codeword being substantially uniform and proceeding both along and across said tracks.

2. Recording apparatus for encoding each successive frame of a series of data words into a corresponding frame of error protected codewords, each codeword having a predetermined number of data symbols and parity symbols, and successively recording the successive frames of codewords in successive frames of a number N (N>2) of coextensive recording tracks of a record carrier; each codeword frame having a predetermined number of successive segments corresponding to successive segments of a track frame, a plurality of the tracks in each track segment being concurrently recorded with a predetermined number of data blocks each of which includes a predetermined number of codeword symbols; said apparatus comprising:

a data store having rows and columns of storage addresses constituting successive storage segments of a data storage frame corresponding to successive track segments of said track frame, the columns of each storage segment corresponding to respective tracks in the related track segment, the rows of each storage segment corresponding to respective codeword symbols in respective data blocks on the respective tracks in the related track segment;

gating means for supplying data words of a data frame to the data store for storage therein;

first encoding means coupled to the data store for encoding the data words therein into first codewords C1 having data symbols and parity symbols in accordance with a first error protection code, and distributing the symbols of the C1 codewords so that the symbols of any particular C1 codeword are stored at storage addresses in the data store corresponding to data blocks on a single track in a single track segment;

second encoding means coupled to the data store for encoding the C1 codewords therein into second codewords C2 having data symbols and parity symbols in accordance with a second error protection code, and distributing the symbols of the C2 codewords so that the symbols of any particular C2 codeword are stored at storage addresses in the data store corresponding to data blocks on a plurality of tracks in each of a plurality of track segments and such that the spacing between successive recorded symbols of any particular C2 codeword will be substantially uniform and have components both along and across the tracks;

the first and second error protection codes together constituting a product code such that a symbol of a codeword in either of said codes is also a symbol of a codeword in the other of said codes, so that an erroneous symbol can be corrected on the basis of parity symbols in either of the C1 and C2 codewords which include the erroneous symbol; and write means for concurrently scanning the coextensive recording tracks and controlled by said second encoding means to retrieve from the data store and write on the tracks in each successive track segment the codeword symbols stored in the corresponding storage segment of the data store, each codeword symbol being written on a track and in a data block thereon corresponding to the storage address from which said symbol was retrieved from the data store.

3. Recording apparatus as claimed in claim 2, wherein the number of symbols in a C2 codeword is an integral multiple of said number N of tracks.

4. Recording apparatus as claimed in claim 2, wherein the cross-track component of the spacing between adjoining recorded symbols of any C2 codeword corresponds to a uniform jump across an integral number n of tracks modulo said number N of all tracks, said number n being prime relative to said number N.

5. Recording apparatus as claimed in claim 4, wherein the along-track spacing between adjoining symbols of any C2 codeword corresponds to a uniform jump along a track, and said number n is 5.

6. Recording apparatus as claimed in claim 2, wherein said record carrier is a magnetic tape.

7. Recording apparatus as claimed in claim 6, wherein said tracks are mutually contiguous across said magnetic tape.

8. Recording apparatus as claimed in claim 7, wherein said recording tracks are disposed on half the lateral width of the magnetic tape and one of such tracks is at an outer edge of said tape.

9. Recording apparatus as claimed in claim 8, wherein the outer edge track is entirely filled with parity symbols which respectively relate to respective C2 codewords.

10. Recording apparatus as claimed in claim 7, wherein independently of tape skew the C1 codewords are physically disposed on said tracks in mutually synchronous relationship.

11. Recording apparatus as claimed in claim 7, wherein:

each of said tracks has a series of data blocks thereon which, independently of tape skew, are mutually synchronous;

a plurality of the data blocks on each track constitute a tape segment which includes all tracks;

the tape segments and tape frames on all tracks are mutually synchronous; and the symbols of a C2 codeword are entirely contained within a single tape frame.

12. Recording apparatus as claimed in claim 11, wherein corresponding data blocks on said plurality of tracks are mutually synchronous and constitute a tape slice, and the symbols of any C2 codeword are uniformly distributed over all slices of the frame which contains such C2 codeword.

13. Recording apparatus as claimed in claim 11, wherein said digital store is a RAM which comprises:

an input RAM segment for storing data words for recording on a tape segment;

a series of RAM segments for storing codeword symbols for a corresponding series of tape segments; and an output RAM segment for supplying codeword symbols of a fully encoded series of C1 and C2 codewords for recording on a tape segment.

14. Recording apparatus as claimed in claim 2, wherein each data block contains symbols of the same number (greater than one) of C1 codewords, and the symbols of different C1 codewords in a data block are interleaved.

15. Recording apparatus as claimed in claim 14, wherein each data block which includes C1 codeword symbols includes the symbols of two C1 codewords and there are eight coextensive recording tracks.

16. Recording apparatus as claimed in claim 2, wherein said number (N) of said plurality of tracks is 8.

17. Recording apparatus as claimed in claim 16, wherein each frame comprises 384 C2 codewords.

18. Recording apparatus as claimed in claim 2, wherein said first code is a (24, 20, 5) code and said second code is a (32, 26, 7) code.

19. Recording apparatus as claimed in claim 2, wherein said record carrier is rewritable.

20. Read apparatus for retrieving from a record carrier a frame of digital codewords which have been recorded thereon in successive segments of a number N (N>2) of coextensive recording tracks, each segment including said number N of tracks, the track segments constituting a track frame corresponding to said codeword frame, each codeword having a predetermined number of data symbols and parity symbols, and decoding said codewords to recover data words represented thereby; the codewords including first codewords C1 having data symbols and parity symbols in accordance with a first error protection code and second codewords C2 having data symbols and parity symbols in accordance with a second error protection code, the two error protection codes together constituting a product code such that a symbol of a codeword in either of said codes is also a symbol of a codeword in the other of said codes; the symbols of the recorded codewords being located in said track frame so that the symbols of any particular C1 codeword are in data blocks on a single track in a single track segment and the symbols of any particular C2 codeword are in data blocks on a plurality of tracks in a plurality of the segments of said track frame; the spacing between successive recorded symbols of any particular C2 codeword being substantially uniform and having components along and across the tracks in said track frame;

a data store having rows and columns of storage addresses constituting successive storage segments of a data storage frame corresponding to the successive segments of said track frame, the columns of each storage segment corresponding to respective tracks in the related track segment, the rows of each storage segment corresponding to respective codeword symbols in respective data blocks on the respective tracks in the related track segment;

read means for concurrently scanning the coextensive recording tracks to retrieve therefrom the codeword symbols in successive track segments and supply said symbols to the data store for storage in corresponding storage segments thereof;

first decoding means coupled to the data store for assembling C1 codewords from the symbols thereof stored in said storage segments, decoding the C1 codewords in accordance with said first error protection code, and storing the decoded C1 codewords in the data store;

second decoding means coupled to the data store for assembling C2 codewords from the symbols thereof stored in said storage segments, decoding the C2 codewords in accordance with said second error protection code, and combining the decoded C1 codewords with the decoded C2 codewords to derive data words represented thereby; and gating means coupled to the data store and controlled by said second decoding means to provide at an output of said gating means the data words derived by said second decoding means.

21. Read apparatus as claimed in claim 20, wherein said data store is a multisegment RAM having rows and columns for therein storing a frame of codewords read from said tracks; said read means sequentially fills a plurality of said RAM segments with symbols of codewords read-out from said tracks, all symbols of a C1 codeword being assigned to one row of a single RAM segment and the symbols of a C2 codeword being assigned to a plurality of segments of a RAM frame, the successive symbols of a C2 codeword having a substantially uniform row and column spacing there-between in said frame modulo the dimensions of said frame.

22. Read apparatus as claimed in claim 21, wherein each

RAM segment is adapted for storing a plurality of C1 codewords which are uniformly distributed along the tracks of a single track frame, each track segment being in a 1:1 correspondence with a RAM segment; and said first decoding means is adapted, upon filling of a RAM segment, to initiate decoding of any C1 codeword which is in such RAM segment.

23. Read apparatus as claimed in claim 22, wherein the symbols of each C2 codeword are stored in a plurality of segments of said RAM up to a boundary set by a succeeding plurality of segments thereof, said second decoding means being adapted to translate the symbols of a C2 codeword to said succeeding plurality of RAM segments and to commence decoding of such C2 codeword when the first decoding means has completed decoding of a related C1 codeword.

24. Read apparatus as claimed in claim 23, wherein said RAM further comprises: an input segment for storing symbols read from one segment of the tracks of the record carrier, and an output segment for storing a decoded segment of the recorded codewords.

25. Read apparatus as claimed in claim 20, wherein said record carrier is a magnetic tape and said read means is a magnetic read head, further comprising means for moving said magnetic tape sequentially past said magnetic head so that said magnetic head sequentially reads a series of codewords at successive positions on the tape, and audio reproducing means for reproducing sound in accordance with the data words derived by the second decoding means.

* * * * *

UNITED STATES PATENT AND TRADEMARK OFFICE
CERTIFICATE OF CORRECTION

PATENT NO. : 5,467,360
DATED : November 14, 1995
INVENTOR(S) : Gerardus C.P. Lokhoff It is certified that error appears in the above-indentified patent and that said Letters Patent is hereby corrected as shown below:

Col. 5, line 5, after "Fig. 8" insert --shows a Table 1 which--;

line 42, after "Table 1" insert --in Fig. 8--.

Signed and Sealed this

Seventh Day of May, 1996

Attest:

BRUCE LEHMAN

Attesting Officer     Commissioner of Patents and Trademarks